UNITED STATES PATENT OFFICE.

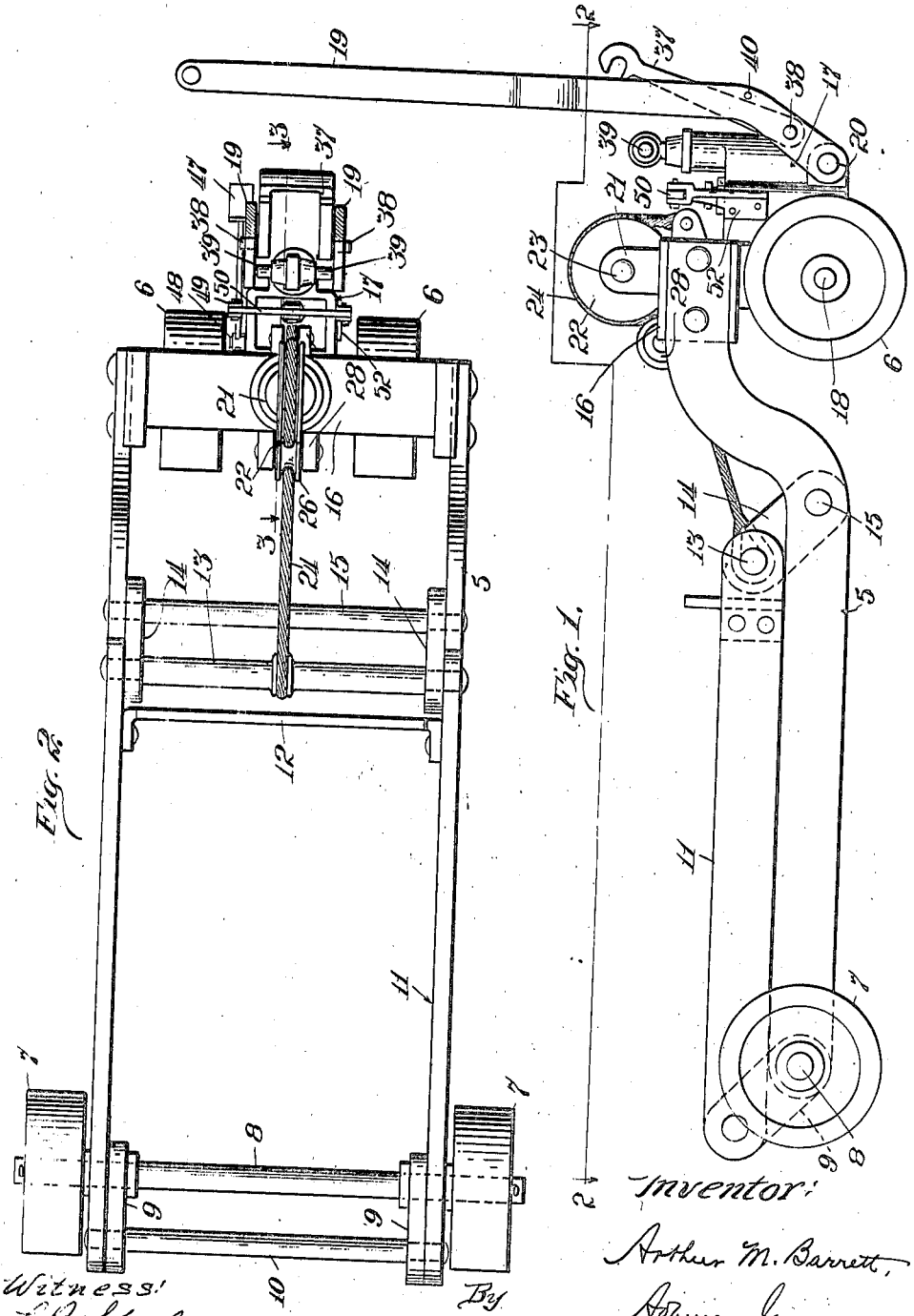

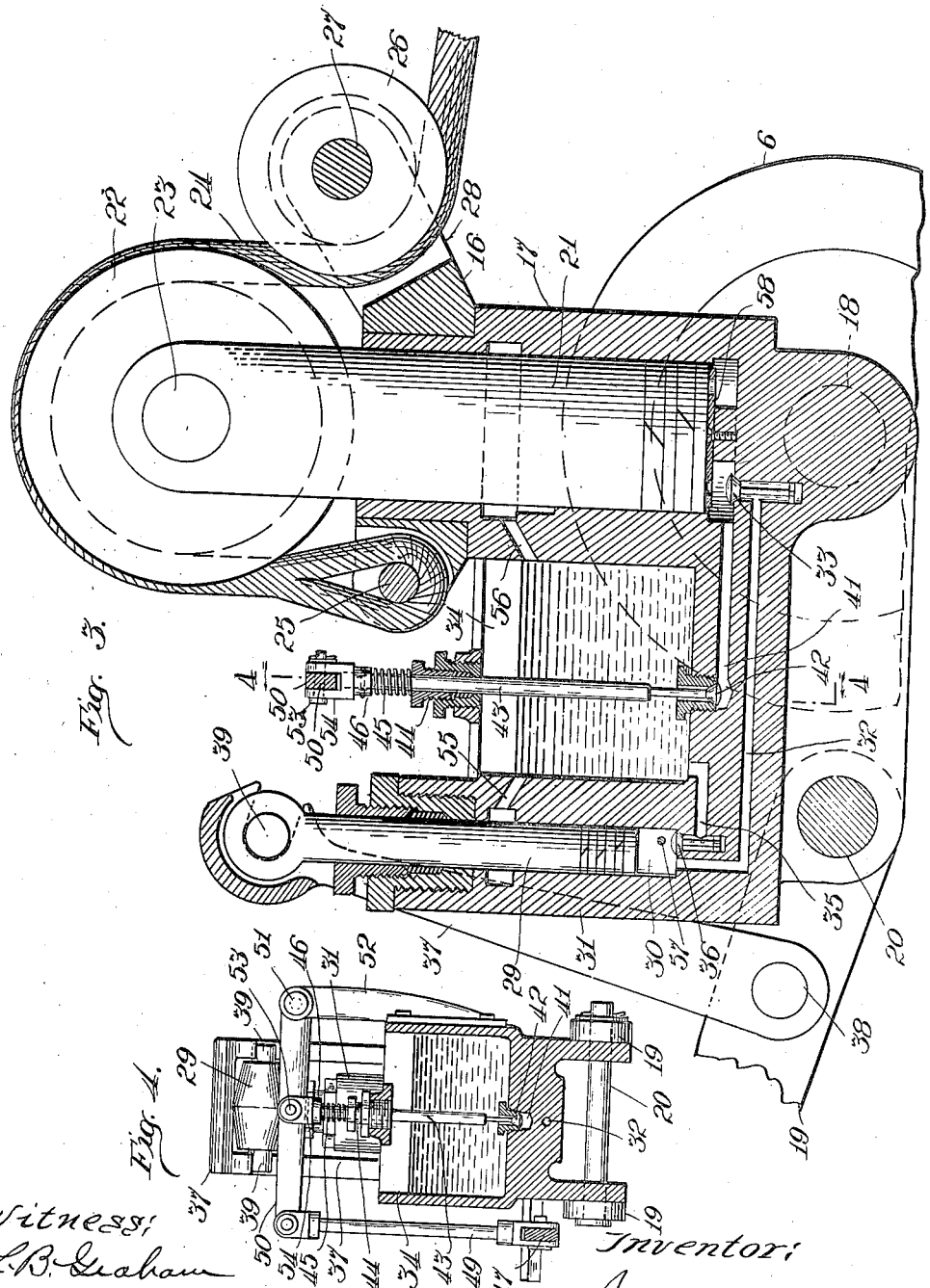

ARTHUR M. BARRETT, OF WINNETKA, ILLINOIS.

TRUCK.

1,416,675. Specification of Letters Patent. Patented May 23, 1922.

Application filed February 5, 1918. Serial No. 215,488.

*To all whom it may concern:*

Be it known that I, ARTHUR M. BARRETT, a citizen of the United States, and a resident of Winnetka, in the county of Cook and State of Illinois, have invented certain new and useful Improvements in Trucks, of which the following is a specification, reference being had to the accompanying drawings.

My invention relates to trucks of the type known as lifting trucks, and has for its object to provide improved means for raising and lowering the usual lifting platform or frame. I accomplish this object as illustrated in the drawings and as hereinafter described. What I regard as new is set forth in the claims.

In the accompanying drawings:

Fig. 1 is a side elevation of my improved truck;

Fig. 2 is a plan view thereof, certain parts being in section on line 2—2 of Fig. 1;

Fig. 3 is an enlarged detail, being a partial vertical section on line 3—3 of Fig. 2; and Fig. 4 is a vertical cross-section substantially on line 4—4 of Fig. 3.

Referring to the drawings,—5 indicates the usual main frame of the truck which is provided with front wheels 6 and rear wheels 7. 8 indicates the axle of the rear wheels, which is a shaft extending transversely of the main frame and suitably connected therewith. Said shaft supports swinging links 9 which carry a transverse shaft 10 secured to the side members of the lifting frame 11. Said side members are connected near their forward ends by a transverse bar 12 and by a second transverse shaft 13 upon which are pivoted front links 14 which correspond with the links 9. The links 14 are pivoted at their lower ends upon a transverse shaft 15 carried by the main frame 5, as shown in Figs. 1 and 2. The arrangement is such that when the lifting frame 11 is in its lowered position it rests upon the main frame 5 and the links 9—14 occupy an inclined position, the shafts 10—13 lying back of the shafts 8—15. By pulling forward on the lifting frame 11 the links 9—14 will swing about the shafts 8—15 and will carry the lifting frame 11 to its elevated position.

16 indicates a cross-head connecting the forward ends of the side bars of the main frame 5, which, as shown in Fig. 1, are gooseneck shaped. 17 indicates a swiveled steering head at the lower portion of which is mounted the front wheel axle 18, the upper portion of said steering head being reduced and rotatably fitted in a suitable central opening in the cross-head 16, as shown in Figs. 2 and 3. Thus the front wheels may be turned to steer the truck. 19 indicates a steering bar or lever, bifurcated at its lower end, which is connected by pivots 20 with the lower forward portion of the steering head 17, as shown in Fig. 1. Said lever also serves to operate the lifting mechanism, as will hereinafter appear.

As best shown in Fig. 3, the steering head 17 is provided with a vertical cylindrical bore in which is mounted a plunger 21. Said plunger extends up beyond the upper end of the steering head and carries at its upper end a grooved pulley 22 mounted on a transverse axis 23. 24 indicates a cable, or other flexible connection, one end of which is secured to the forward portion of the cross-head 16, preferably by looping it over a pin 25. Said cable passes over the pulley 22, fitting in the groove thereof, and thence passes under a pulley 26 mounted on a pivot 27 supported by lugs 28 provided on the cross-head 16 at the rear of the plunger 21. The opposite end of the cable 24 is connected with the lifting frame 11, preferably by securing it to the shaft 13, as shown in Fig. 2. The length of the cable 24 is such that when the plunger 21 is in its lowered position and the cable is comparatively taut, the lifting frame 11 will also be in its lowered position. It will be obvious that by this construction if the plunger 21 be forced up it will draw upon the cable 24 and will consequently exert a forward pull on the lifting frame 11, thereby elevating said frame upon the links 9—14. Downward movement of the plunger 21 will permit the lifting frame to descend.

The plunger 21 is raised by means of a piston 29 which is mounted in a cylinder 30 provided in a head 31 located at the forward portion of the steering head 17 and preferably formed integral therewith. The lower portion of the cylinder 30 is connected with the lower portion of the cylinder in which the plunger 21 is fitted by means of a duct 32, a check valve 33 being provided to prevent liquid from flowing toward the cylinder 30.

34 indicates a liquid reservoir provided in the steering head 17 between the two cylinders above described. The lower portion of said reservoir is connected by a duct 35 with the lower portion of the cylinder 30, and a check valve 36 is provided to prevent liquid from flowing from the cylinder 30 to said reservoir. By the construction described, when the piston 29 is operated, liquid will be drawn from the reservoir 34 into the cylinder 30 below said piston on the up stroke thereof, and on the down stroke thereof will be forced through the duct 32 into the plunger cylinder below the plunger 21, thereby causing said plunger to rise and lift the lifting frame. It will be evident that the relative dimensions of the two cylinders in cross-section may be made such as to provide any desired multiplication of power, and consequently the construction is one which is well adapted for trucks designed to lift heavy loads. The piston 29 is operated by means of the lever 19 through a swinging bifurcated link 37 which is pivoted at 38 to the members of the lever 19 and is adapted to be hooked over a cross-pin 39 at the upper end of the piston 29. As the plunger 21 is swiveled on the fluid in the cylindrical bore of the steering head 17 the engagement of the link 37 with the pin 39 does not interfere with the steering of the truck, and the piston may be operated to raise the lifting frame regardless of the angular position of the steering lever 19 with reference to the longitudinal axis of the truck. It will be noted that when the plunger 21 is projected in the manner described, it will retain its position, and will consequently hold the lifting frame up without the use of locking devices so long as the liquid is retained in the plunger cylinder. The steering of the truck is not interfered with because the plunger 21 is in vertical alinement with the center of the front wheel axle, and is swiveled on the fluid in its cylinder; consequently the steering head 17 may be turned in the cross-head 16 while the pulley 22 maintains its alinement with the longitudinal axis of the truck. To permit the plunger 21 to descend, the lower portion of the cylinder in which it is mounted is connected by a duct 41 with the lower portion of the reservoir 34, as shown in Fig. 3, a check-valve 42 being provided to normally prevent the flow of liquid toward said reservoir. For normally holding said check-valve on its seat it is connected to a rod 43 which extends upwardly through the reservoir 34 and through a stuffing box or other suitable bearing 44, upon which rod is a spring 45 which bears against a collar 46 on the upper portion of said rod, as shown in Fig. 3. The tension of said spring presses the check-valve 42 upward against its seat, and consequently holds the liquid in the plunger cylinder. For moving the rod 43 downward to open the check-valve 42, I provide a lever 47, preferably a foot-lever, which is fulcrumed at 48 on the steering head and extends forward from its fulcrum so that it may be conveniently operated. Said lever is connected intermediately, by a rod 49, with a transverse lever 50 fulcrumed at 51 upon a suitable standard 52 also secured to the steering head, as shown in Fig. 4. The lever 50 is connected intermediately by a pivot 53 with a yoke 54 at the upper end of the rod 43, as shown in Figs. 3 and 4. Thus, when the lever 47 is depressed the rod 43 will be moved downward and the check-valve 42 opened.

55 indicates a passage leading from the upper portion of the cylinder 30 into the reservoir 34 for returning to said reservoir any liquid which works up around the piston 29. A similar passage 56 is provided leading from the upper portion of the plunger cylinder to said reservoir, for preventing the plunger from being forced up too high. 57 indicates a cross-pin provided above the check-valve 36 for preventing excessive upward movement of said check-valve, and 58 indicates a plate provided above the check-valve 33 for a similar purpose.

My improved truck possesses great flexibility as the extent to which the lifting frame is raised or lowered depends upon the range of movement of the cable, which, in the construction shown, is determined by the extent to which it is deflected intermediately, and the position of the plunger is always under the control of the operator through the hydraulic mechanism, regardless of the position of the steering lever,—consequently the movement of the cable in raising or lowering the lifting frame may be stopped or started at pleasure. The cylinder 34 being supplied with a suitable quantity of a liquid, such as oil, it will be apparent that it may then be practically sealed and no further supply of oil will be needed for an indefinite length of time, as the oil merely passes from one cylinder to the other as the truck is operated and is not consumed to any appreciable extent.

It will be understood that my invention is not limited to the specific embodiment thereof illustrated and described, as it is subject to modification in various details, and the claims hereinafter made are not to be limited to the specific construction shown except in so far as they may be particularly directed thereto. My invention is, however, subordinate to that of an application filed February 18, 1918, by William T. Johnston, Serial No. 217,817, as regards any subject-matter common to the structures of our several applications.

What I claim as my invention and desire to secure by Letters Patent, is—

1. A lifting truck, comprising a main frame having supporting and steering wheels, an endwise movable lifting frame mounted on said main frame, a cable connected with said main and lifting frames, and reciprocating means in alinement with the turning axis of the steering wheels for deflecting said cable intermediately to move said lifting frame endwise.

2. A lifting truck, comprising a main frame having supporting and steering wheels, a lifting frame, a cable connected with said main and lifting frames, and means supported by said steering wheels in alinement with the turning axis thereof and adapted to be operated to deflect said cable intermediately and thereby raise said lifting frame.

3. A lifting truck comprising a steering member, a lifting frame, a cable adapted to be actuated to raise said lifting frame, and means supported by said steering member in alinement with the turning of the axis thereof adapted to be operated to actuate said cable to raise the lifting frame.

4. A lifting truck comprising a lifting frame, a steering member, a cable adapted to be operated to raise said lifting frame, a plunger supported by said steering member in alinement with the turning axis thereof and adapted to be operated to actuate said cable to raise said lifting frame, and means for operating said plunger.

5. A lifting truck comprising a lifting frame, a steering member, a cable adapted to be operated to raise said lifting frame, hydraulic mechanism supported by said steering member in alinement with the turning axis thereof and adapted to be operated to actuate said cable to raise said lifting frame, and means for operating said hydraulic mechanism.

6. A lifting truck, comprising a main frame, a steering member adapted to turn laterally to steer the truck, a lifting frame, a cable connected with said main and lifting frames, and means, in alinement with the axis of said steering member, adapted to be operated to deflect said cable intermediately and thereby raise said lifting frame.

7. A lifting truck, comprising a main frame, a steering member adapted to turn laterally to steer the truck, a lifting frame, a cable connected with said main and lifting frames, means, in alinement with the axis of said steering member, adapted to be operated to deflect said cable intermediately and thereby raise said lifting frame, and hydraulic mechanism for operating said means.

8. A lifting truck, comprising a main frame having a steering member, a lifting frame, a cable connected with said main and lifting frames, means in alinement with the axis of said steering member adapted to be operated to actuate said cable and thereby raise said lifting frame, and hydraulic mechanism supported by said steering member, for operating said means.

9. A lifting truck, comprising a main frame, a steering member adapted to turn laterally to steer the truck, a lifting frame, a cable connected with said main and lifting frames, a plunger mounted in said steering member and adapted when projected to deflect said cable, and means carried by said steering member for controlling the operation of said plunger.

10. A lifting truck, comprising a main frame, a steering member adapted to turn laterally to steer the truck, a lifting frame, a cable connected with said main and lifting frames, a plunger mounted in said steering member in alinement with the axis thereof and adapted to be operated to deflect said cable intermediately, and means carried by said steering member for operating said plunger.

11. A lifting truck, comprising a main frame, a steering member adapted to turn laterally to steer the truck, a lifting frame, a plunger carried by said steering member coaxially therewith, means cooperating with said plunger for raising said lifting frame, and hydraulic mechanism carried by said steering member for operating said plunger.

12. A lifting truck, comprising a main frame, a steering member adapted to turn laterally to steer the truck, a lifting frame, a plunger carried by said steering member, means cooperating with said plunger for raising said lifting frame, hydraulic mechanism carried by said steering member for operating said plunger, a steering lever, and means operatively connecting said lever with said hydraulic mechanism.

13. A lifting truck, comprising a main frame, a steering member adapted to turn laterally to steer the truck, a lifting frame, a plunger carried by said steering member, means cooperating with said plunger for raising said lifting frame, hydraulic mechanism carried by said steering member for operating said plunger, a steering lever, and means whereby said lever may be operatively connected with or be disconnected from said hydraulic mechanism.

14. A lifting truck, comprising a main frame, a steering member adapted to turn laterally to steer the truck, a lifting frame, a plunger carried by said steering member, means cooperating with said plunger for raising said lifting frame, a piston carried by said steering member, a liquid reservoir, and passages whereby liquid may be forced under said plunger by actuating said piston.

15. A lifting truck, comprising a main frame, a steering member adapted to turn laterally to steer the truck, said steering member having piston and plunger chambers, a liquid reservoir, and passages connecting said chambers and reservoir, a plunger mounted in said plunger chamber, a piston mounted in said piston chamber, a lifting frame, means cooperating with said plunger for raising said lifting frame, a lever connected with said steering member for steering the truck, means for connecting said lever with said piston, and means adapted to be actuated to permit liquid to flow from said plunger chamber to said reservoir.

16. A lifting truck, comprising a main frame, a steering member adapted to turn laterally to steer the truck, said steering member having piston and plunger chambers, a liquid reservoir, and passages connecting said chambers and reservoir, a plunger mounted in said plunger chamber, a piston mounted in said piston chamber, a lifting frame, means cooperating with said plunger for raising said lifting frame, a lever connected with said steering member for steering the truck, means for connecting said lever with said piston, a lever mounted on said steering member, and means operated by said lever for permitting liquid to flow from said plunger chamber to said reservoir.

17. A lifting truck, comprising a main frame having supporting and steering wheels, a lifting frame, a cable connected with said lifting frame, a reciprocating plunger for operating said cable to raise the lifting frame, said plunger being rotatably supported by said steering wheels so that said steering wheels may turn about a substantially vertical axis independently thereof, and a steering lever arranged to operate said plunger regardless of the angular position of the steering wheels.

18. A lifting truck, comprising a main frame having supporting and steering wheels, a lifting frame, a cable connected with said main and lifting frames, a reciprocating plunger engaging said cable intermediately for operating the same to raise the lifting frame, said plunger being rotatably supported by said steering wheels so that said steering wheels may turn about a substantially vertical axis independently thereof, and a steering lever arranged to operate said plunger regardless of the angular position of the steering wheels.

19. A lifting truck, comprising a main frame having supporting and steering wheels, a lifting frame, a plunger supported by said steering wheels, means operated by said plunger for raising the lifting frame, a reciprocating piston rotatably supported by said steering wheels and adapted to be operated to actuate said plunger, and a steering lever arranged to operate said piston regardless of the angular position of the steering wheels.

20. A lifting truck, comprising a main frame having supporting and steering wheels, a lifting frame, a steering lever, and hydraulic mechanism adapted to be operated by said lever regardless of the angular position of the steering wheels for raising said lifting frame.

21. A lifting truck comprising a main frame having supporting wheels and a swiveled steering head, a lifting frame mounted on said main frame, a cable connected with said lifting frame, and reciprocating means co-axial with the swivel of said steering head for operating said cable to raise said lifting frame.

22. A lifting truck comprising a main frame having supporting wheels and a swiveled steering head, a lifting frame mounted on said main frame, a cable connected with said lifting frame, reciprocating means coaxial with the swivel of said steering head for operating said cable to raise said lifting frame, a steering handle, and means operated by said steering handle for actuating said reciprocating means.

23. A lifting truck comprising a main frame having supporting wheels and a swiveled steering head, a lifting frame, a cable connected with said lifting frame, and reciprocating means supported coaxially with said steering head and adapted to be operated to actuate said cable to raise said lifting frame.

24. A lifting truck comprising a main frame having supporting wheels and a steering head, a lifting frame, a cable connected with said lifting frame, a plunger supported by said steering head coaxially therewith and adapted to be operated to actuate said cable to raise said lifting frame, and means for operating said plunger.

25. A lifting truck comprising a main frame, a steering member adapted to turn laterally to steer the truck, a lifting frame, a plunger carried by said steering member coaxially therewith, and a cable connected with said lifting frame and actuated by said plunger for raising the lifting frame.

26. A lifting truck comprising a main frame, a steering member adapted to turn laterally to steer the truck, a lifting frame, a plunger carried by said steering member coaxially therewith, a cable connected with said lifting frame and actuated by said plunger for raising the lifting frame, a steering handle connected with said steering member, and means for actuating said plunger by the operation of said steering handle.

27. In an elevating truck, the combination with a platform, of wheeled supports therefor, one of said supports being dirigible for steering the truck and means for elevating the platform on the wheeled supports comprising a lifting jack including an upright cylinder and a plunger operating therein in alinement with the turning axis of said dirigible support, and means for forcing fluid into said cylinder to raise said platform.

28. An elevating truck comprising an elevating frame, a wheeled support adapted to turn about an upright axis relative to the frame to steer the truck, and lifting mechanism including a fluid-pressure cylinder coaxial with the turning axis and a plunger operating in said cylinder, a lifting and steering handle, and means actuated by said handle for forcing fluid into said cylinder to raise the elevating frame.

ARTHUR M. BARRETT.